F. L. PALMER.
METHOD OF MAKING COMFORTABLES FROM CONTINUOUS FABRICS.
No. 10,861. Reissued Aug. 23, 1887.
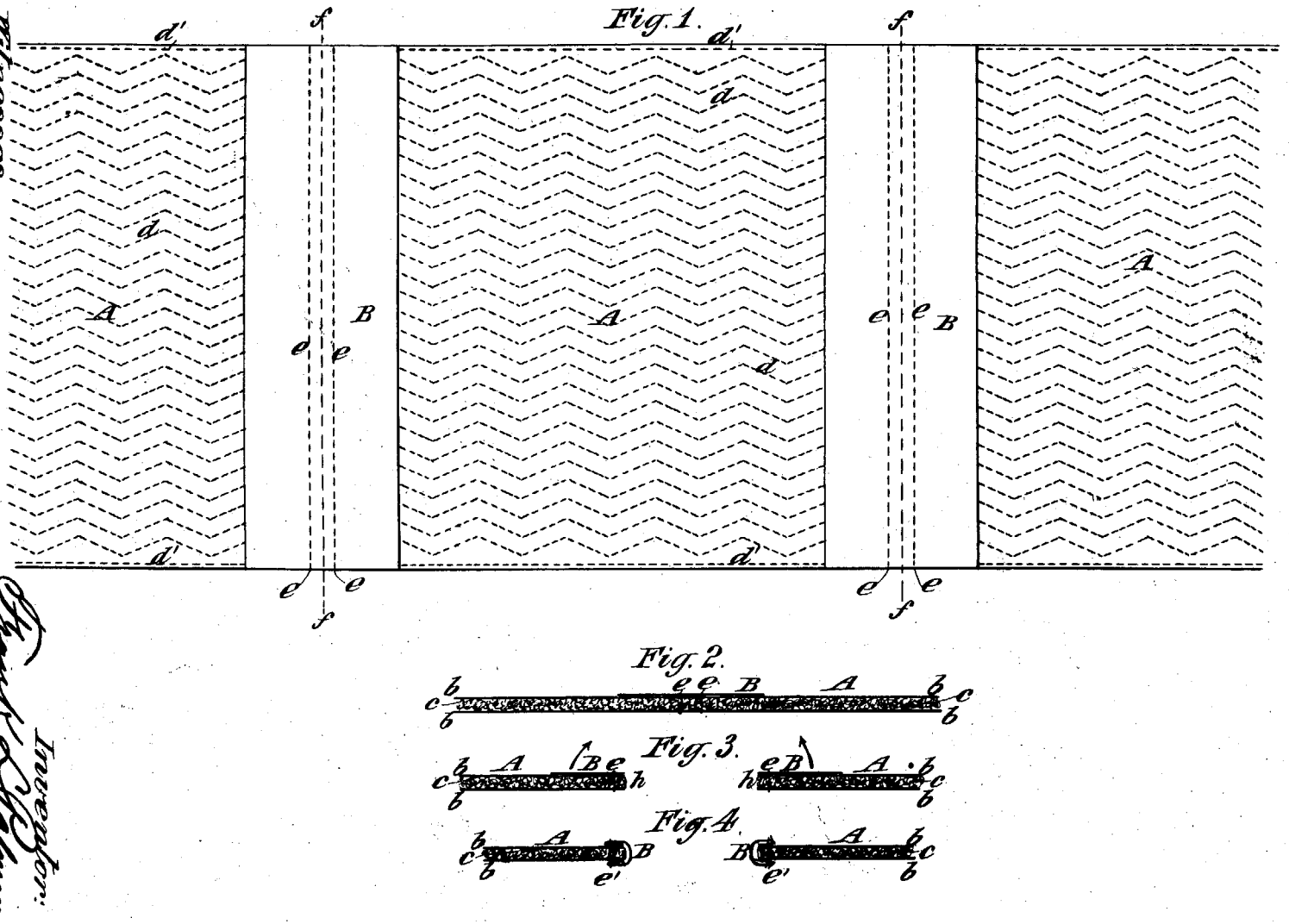
Witnesses:
C. L. Sundgren
Emil Porter.
Inventor:
Frank L. Palmer
by his Attys
Brown & Hall

UNITED STATES PATENT OFFICE.

FRANK L. PALMER, OF NEW LONDON, CONNECTICUT.

METHOD OF MAKING COMFORTABLES FROM CONTINUOUS FABRICS.

SPECIFICATION forming part of Reissued Letters Patent No. 10,861, dated August 23, 1887.

Original No. 363,670, dated May 24, 1887. Application for reissue filed June 21, 1887. Serial No. 242,042.

*To all whom it may concern:*

Be it known that I, FRANK L. PALMER, of New London, in the county of New London and State of Connecticut, have invented a new and useful Improvement in the Method of Making Comfortables from Continuous Fabrics, of which the following is a specification.

My invention relates to an improvement in the method of making comfortables which involves the securing together of two continuous face fabrics and an interposed layer of filling, thereby forming a continuous compound fabric, which is afterward cut transversely into pieces of the proper size to form comfortables. In carrying out this method it has been usual, after cutting the fabric transversely into comfortables, to finish the ends of the comfortable by pulling out a portion of the cotton or other filling for a short distance from its cut end and across the width, and to then turn in the raw edges of the face fabrics and stitch them together. This method of finishing the cut ends of the comfortables is undesirable, because it is impossible to pull out the filling along a straight line, and at some portions or points in the width of the comfortable too much filling will be pulled out, while at other points not enough will be removed. This gives the filling at the ends of the comfortables an irregular outline, and the stitching together of the face fabrics after the filling is removed gives to the comfortable an irregular or thin edge or end. The old method is also objectionable, because when the quilting is done before the compound fabric is cut transversely and the lines of stitching forming the quilting are ripped back to permit of the removal of a portion of the filling and the turning in of the face fabrics, the loose ends of the quilting-threads are left exposed and unsecured.

The object of my invention is to secure and cover the loose ends of the quilting-threads, and to enable the ends of the comfortable to be finished at less expense, and also to finish the ends in an even and regular manner and to maintain the filling of full thickness entirely to the ends of the face fabrics.

In carrying out my invention I first secure together two continuous face fabrics and an interposed filling, in order to form a compound fabric, and I subsequently cut the compound fabric transversely to form comfortables which have their cut ends or edges full or with the filling coincident with the face fabrics and exposed to view at the ends of the fabrics, and usually the continuous compound fabric is quilted throughout its width by approximately longitudinal rows of stitching before the compound fabric is cut transversely. I then cover the cut ends or edges of the comfortable and the ends of the quilting-threads. The desired result of securing the ends of the quilting-threads may be attained by sewing transversely across the compound fabric before or after cutting the compound fabric transversely, and the quilting-threads will then be secured adjacent to the points at which they have been or are to be cut. The desired results of covering the cut edge or end of the compound fabric and the quilting-threads may be attained by applying over the raw end of the comfortable an end-protection strip, which forms a finish thereto.

In applying the end-protection strip above described, I prefer to secure a strip of proper width directly across the continuous fabric at the desired point by parallel rows of stitching, and then cut through the compound fabric and strip between the parallel rows of stitching and transversely to the compound fabric, and I finally fold the cut portions of the strip over the raw ends of the compound fabric and there secure them by lines of stitching.

In the accompanying drawings, Figure 1 represents a portion of a continuous compound fabric of sufficient length to form one comfortable and portions of two others, showing the strips of fabric which are to form the end protections of the comfortables as exaggerated in width and secured transversely to the compound fabric by parallel rows of stitching. Fig. 2 is a longitudinal section of a portion of the compound fabric shown in Fig. 1. Fig. 3 is a similar section showing the adjacent ends of two comfortables formed by cutting the compound fabric transversely between the parallel lines of stitching which secure the end-protection strip thereto; and Fig. 4 is a sectional view similar to Fig. 3, showing the end-protection strips as folded over the raw or cut ends of the comfortables and secured thereto.

Similar letters of reference designate corresponding parts in all the figures.

In carrying out my invention I first produce a continuous compound fabric which is cut transversely to form comfortables, and which is composed of two face fabrics and an interposed filling.

In the drawings, A designates the compound fabric, *b b* the continuous face fabrics, and *c* the interposed filling, which may be of cotton or other material. This compound fabric may be produced according to the method set forth in my Letters Patent No. 354,866, dated December 21, 1886, and in this example of my invention the face fabrics *b* and the interposed filling *c* are secured together throughout their width by quilting *d* and by edge-stitching *d'*. It will be understood that when the compound fabric thus formed is cut transversely into comfortables the ends of the comfortables will be raw or have the interposed filling exposed, as shown in Fig. 3; and according to the method now employed of finishing these ends the lines of quilting have been ripped back, the filling has been pulled out across the comfortable for a short distance inward from its cut end, and the face fabrics have been folded in and stitched. This has reduced the size of the comfortable somewhat, and is also objectionable because it leaves loose the ends of the quilting-threads, is impossible to pull the filling out at the end along a straight line, and at certain points in the width of the comfortable too much filling is pulled, while at other points not enough is removed. This method gives a thin and uneven or lumpy end to the comfortable.

According to my method I leave the cut ends of the comfortable full, or with the filling *c* coincident with the ends of the face fabrics *b*, as shown in Fig. 4, and I cover the full cut ends or edges of the comfortable and the ends of the quilting-threads, as by applying to these raw or cut ends, which are left full, end-protection strips B, as shown in Fig. 4. This enables me to finish the comfortable of somewhat larger size than has been before possible, and to leave the filling full clear to the end of the comfortable, thereby maintaining the full thickness and forming a straight and perfect edge, and to avoid the thin and lumpy or uneven end which has been a result of the old method of finishing the ends.

The particular manner in which I here apply the end-protection strips B will be best understood from Figs. 1, 2, and 3. While the compound fabric A is continuous, or before it is cut transversely, I apply across its face transverse strips B, which are shown in Fig. 1, at the points where it is to be cut transversely to form comfortables, and I secure such strips B by parallel rows of stitching, *e*, the parallel rows being placed at suitable distances apart.

After the strips B are applied I cut through the compound fabric, and also through the strip B along the dotted line *f* and between the parallel rows of stitching *e*, and I thus divide the continuous compound fabric into portions A, which are of proper size to form comfortables. Figs. 3 and 4 only show the adjacent ends of two such portions, the two ends each having a portion of the strip B secured to them, each by a row of stitching, *e*, as will be understood from Fig. 3. I do not then pull out any of the filling *c*, as has been usual; but I leave the cut ends *h* of the comfortables full, as shown in Fig. 3, or with the filling *c* coincident with the cut ends of the face fabrics *b*, and after this is done I fold the end-protection strips B, in the direction of the arrows shown in Fig. 3, over the raw or cut ends of the comfortables, and bring them to the position shown in Fig. 4, where they are secured by an additional row of stitching, *e'*. In this way I obtain a neat finish for the cut or raw ends of the comfortable, which I produce of the full size to which it is cut, and without any reduction in length, which is necessary when the filling at the ends is pulled out and the face fabrics are turned in and stitched down.

It will also be observed that the end-protection strips B, which I apply to the comfortables, not only cover the raw or cut edges or ends of the face fabrics *b c*, but they also cover the cut ends of the thread employed in making the stitching *d d'*, and thus give a very neat finish to the ends of the comfortables, and the cross-lines of stitching *d'* secure the ends of the quilting-threads.

My invention only relates to a method of making comfortables which is continuous—that is to say, which involves the preparation of a compound fabric and the cutting of this compound fabric transversely into pieces of the proper size to form comfortables.

I am aware that blankets have been finished with a binding, and that shirt-bosom protectors have been formed of several thicknesses connected by a binding, and I have therefore limited my invention to an improvement in the method of making comfortables from continuous fabrics, whereby the edges are secured, and which is preferable to the old method of finishing the cut ends, as before described. When the ends have been finished, as heretofore, by pulling out the filling along the end and turning in and sewing together the face fabrics, the end is necessarily lumpy and uneven, the comfortable is slightly reduced in length, and the quilting-threads are not concealed. When the compound fabric is cut, the filling extends to the ends and is coincident with the ends of the face fabrics, and by applying the end-protection strips to the raw ends or edges of such compound fabric the filling and the ends of the quilting-threads are concealed and the compound fabric or comfortable is maintained of full thickness entirely to the ends, and the ends or edges are perfectly straight and true.

What I claim as my invention, and desire to secure by Letters Patent, is—

1. The improvement in the method of making comfortables from continuous fabrics, consisting in bringing together two face fabrics and an interposed filling, in securing the face fabrics and filling together throughout their width by lines of quilting, in cutting the compound fabric transversely to form comfortables, and in covering the edges or ends of the comfortable and the ends of the quilting-threads, substantially as herein described.

2. The improvement in the method of making comfortables, consisting in bringing together two face fabrics and an interposed filling, in securing the face fabrics and filling together throughout their width by lines of quilting, and in afterward cutting and sewing the compound fabric transversely to form comfortables having their cut ends or edges full, and with the face fabrics and filling substantially coincident, and to secure the quilting-threads adjacent to the points at which they have been or are to be cut, substantially as herein described.

3. The improvement in the method of making comfortables from continuous fabrics, consisting in securing together two face fabrics and an interposed filling, in subsequently cutting the compound fabric transversely to form comfortables which have their cut ends full, or with the filling coincident with the face fabrics and exposed at the ends of the comfortable, and in afterward applying end-protection strips to the cut ends of the comfortable, whereby such cut ends are maintained of full thickness and the filling concealed and confined, substantially as herein described.

4. The improvement in the method of making comfortables from continuous fabrics, consisting in securing together by quilting two face fabrics and an interposed filling, in subsequently cutting the compound fabric transversely to form comfortables which have their cut ends full, or with the filling coincident with the face fabrics and exposed at the ends of the comfortable, and in afterward applying to the cut ends end-protection strips, which cover the cut ends of the fabric and the cut ends of the quilting-threads and conceal and confine the filling, while maintaining the cut ends or edges of the comfortable of full thickness, substantially as herein described.

5. The improvement in the method of making comfortables, consisting in first producing a continuous compound fabric composed of two face fabrics and an interposed filling, in securing by parallel rows of stitching a transverse strip of fabric on the continuous compound fabric, in then cutting the compound fabric through the strip and between the parallel rows of stitching, and in finally folding the cut portions of the strip over the raw ends of the compound fabric and then securing them, substantially as herein described.

FRANK L. PALMER.

Witnesses:
FREDK. HAYNES,
C. E. SUNDGREN.